(12) United States Patent
Barnhart et al.

(10) Patent No.: US 10,288,293 B2
(45) Date of Patent: May 14, 2019

(54) FUEL NOZZLE WITH FLUID LOCK AND PURGE APPARATUS

(71) Applicant: General Electric Company, Schenectady, NY (US)

(72) Inventors: David Richard Barnhart, Jefferson, OH (US); Joshua Tyler Mook, Loveland, OH (US)

(73) Assignee: General Electric Company, Schenectady, NY (US)

( * ) Notice: Subject to any disclaimer, the term of this patent is extended or adjusted under 35 U.S.C. 154(b) by 9 days.

(21) Appl. No.: 15/039,065

(22) PCT Filed: Nov. 21, 2014

(86) PCT No.: PCT/US2014/066966
§ 371 (c)(1),
(2) Date: May 25, 2016

(87) PCT Pub. No.: WO2015/122952
PCT Pub. Date: Aug. 20, 2015

(65) Prior Publication Data
US 2017/0159938 A1   Jun. 8, 2017

Related U.S. Application Data

(60) Provisional application No. 61/909,646, filed on Nov. 27, 2013.

(51) Int. Cl.
F23R 3/14 (2006.01)
F23R 3/28 (2006.01)
(Continued)

(52) U.S. Cl.
CPC ............... F23R 3/34 (2013.01); F02C 7/232 (2013.01); F23R 3/14 (2013.01); F23R 3/28 (2013.01);
(Continued)

(58) Field of Classification Search
CPC .... F23R 3/00; F23R 3/34; F23R 3/343; F23R 2900/00004; F02C 9/26; F02C 9/266;
(Continued)

(56) References Cited
U.S. PATENT DOCUMENTS 1,908,066 A   5/1933   Sedlmeir
3,258,838 A   7/1966   Tilton
(Continued)

FOREIGN PATENT DOCUMENTS

CN   2007-530263 A   11/2007
CN   101900340 A   12/2010
(Continued)

OTHER PUBLICATIONS

Tech-Etch, "Flat Parts Design Guide", Aug. 24, 2005, http://www.tech-etch.com:80/photoetch/flatguide.html.*
(Continued)

Primary Examiner — Gerald L Sung
Assistant Examiner — Stephanie Cheng
(74) Attorney, Agent, or Firm — General Electric Company; Pamela A. Kachur

(57) ABSTRACT

A fuel nozzle apparatus has a centerline axis, and includes: a main fuel injector including an enclosed interior volume in fluid communication with a plurality of fuel ports configured to discharge fuel therefrom; a main fuel conduit disposed upstream of the main fuel injector and configured to supply liquid fuel to the interior volume; and a fluid lock disposed between the main fuel conduit and the main fuel injector, the fluid lock including a plurality of parallel capillary channels.

19 Claims, 4 Drawing Sheets

(51) Int. Cl.
*F23R 3/34* (2006.01)
*F02C 7/232* (2006.01)

(52) U.S. Cl.
CPC ...... *F05D 2220/32* (2013.01); *F05D 2240/35* (2013.01); *F23D 2900/11101* (2013.01); *F23R 2900/00004* (2013.01); *Y02T 50/675* (2013.01)

(58) Field of Classification Search
CPC .. F02C 7/232; F16K 99/0021; F16K 99/0017; F23K 5/18; F05D 2260/602; F02M 2200/06; F02M 2200/60
USPC .......................................................... 137/836
See application file for complete search history.

(56) References Cited

U.S. PATENT DOCUMENTS

| | | | |
|---|---|---|---|
| 3,291,191 A | 12/1966 | Stoops | |
| 3,480,416 A | 11/1969 | Stoops et al. | |
| 3,656,222 A | 4/1972 | Jones | |
| 3,672,032 A | 6/1972 | Witherspoon | |
| 3,684,186 A | 8/1972 | Helmrich | |
| 3,707,750 A | 1/1973 | Klass | |
| 3,837,198 A | 9/1974 | Higgins | |
| 3,909,157 A | 9/1975 | Wachtell et al. | |
| 4,085,717 A | 4/1978 | Willmann et al. | |
| 4,088,437 A | 5/1978 | Holzapfel | |
| 4,216,652 A | 8/1980 | Herman | |
| 4,247,259 A | 1/1981 | Saboe et al. | |
| 4,273,070 A | 6/1981 | Hoefelmayr | |
| 4,327,547 A | 5/1982 | Hughes et al. | |
| 4,425,755 A | 1/1984 | Hughes | |
| 4,461,323 A | 7/1984 | Morikawa et al. | |
| 4,582,093 A | 4/1986 | Hubbard et al. | |
| 4,584,834 A | 4/1986 | Koshoffer et al. | |
| 4,609,150 A | 9/1986 | Pane, Jr. et al. | |
| 4,610,320 A | 9/1986 | Beakley | |
| 4,674,167 A | 6/1987 | Hubbard et al. | |
| 4,722,559 A | 2/1988 | Bongartz | |
| 4,798,330 A | 1/1989 | Mancini et al. | |
| 4,969,110 A | 11/1990 | Little et al. | |
| 5,038,014 A | 8/1991 | Pratt et al. | |
| 5,057,073 A | 10/1991 | Martin | |
| 5,062,205 A | 11/1991 | Fraser | |
| 5,097,666 A * | 3/1992 | Shekleton | F02C 7/2365 60/737 |
| 5,117,637 A | 6/1992 | Howell et al. | |
| 5,197,191 A | 3/1993 | Dunkman et al. | |
| 5,270,926 A | 12/1993 | Tam | |
| 5,297,215 A | 3/1994 | Yamagishi | |
| 5,309,709 A | 5/1994 | Cederwall et al. | |
| 5,321,947 A | 6/1994 | Sood et al. | |
| 5,321,951 A | 6/1994 | Falls et al. | |
| 5,329,761 A | 7/1994 | Ablett et al. | |
| 5,435,884 A * | 7/1995 | Simmons | B05B 1/3436 216/100 |
| 5,460,758 A | 10/1995 | Langer et al. | |
| 5,474,419 A | 12/1995 | Reluzco et al. | |
| 5,501,840 A | 3/1996 | Mantovani et al. | |
| 5,673,552 A | 10/1997 | Idleman et al. | |
| 5,713,205 A | 2/1998 | Sciocchetti et al. | |
| 5,715,167 A | 2/1998 | Gupta et al. | |
| 5,761,907 A | 6/1998 | Pelletier et al. | |
| 5,794,601 A | 8/1998 | Pantone | |
| 5,824,250 A | 10/1998 | Whalen et al. | |
| 5,836,163 A | 11/1998 | Lockyer | |
| 5,916,142 A | 6/1999 | Snyder et al. | |
| 5,963,314 A | 10/1999 | Worster et al. | |
| 5,988,531 A | 11/1999 | Maden et al. | |
| 5,993,731 A | 11/1999 | Jech et al. | |
| 6,003,756 A | 12/1999 | Rhodes | |
| 6,032,457 A | 3/2000 | McKinney et al. | |
| 6,041,132 A | 3/2000 | Isaacs et al. | |
| 6,068,330 A | 5/2000 | Kasuga et al. | |
| 6,134,780 A | 10/2000 | Coughlan et al. | |
| 6,144,008 A | 11/2000 | Rabinovich | |
| 6,227,801 B1 | 5/2001 | Liu | |
| 6,256,995 B1 | 7/2001 | Sampath et al. | |
| 6,269,540 B1 | 8/2001 | Islam et al. | |
| 6,283,162 B1 | 9/2001 | Butler | |
| 6,321,541 B1 * | 11/2001 | Wrubel | F23R 3/283 60/740 |
| 6,354,072 B1 | 3/2002 | Hura | |
| 6,355,086 B2 | 3/2002 | Brown et al. | |
| 6,363,726 B1 | 4/2002 | Durbin et al. | |
| 6,367,262 B1 | 4/2002 | Mongia et al. | |
| 6,381,964 B1 | 5/2002 | Pritchard, Jr. et al. | |
| 6,389,815 B1 | 5/2002 | Hura et al. | |
| 6,391,251 B1 | 5/2002 | Keicher et al. | |
| 6,405,095 B1 | 6/2002 | Jang et al. | |
| 6,418,726 B1 | 7/2002 | Foust et al. | |
| 6,419,446 B1 | 7/2002 | Kvasnak et al. | |
| 6,442,940 B1 | 9/2002 | Young et al. | |
| 6,453,660 B1 | 9/2002 | Johnson et al. | |
| 6,460,340 B1 | 10/2002 | Chauvette et al. | |
| 6,461,107 B1 | 10/2002 | Lee et al. | |
| 6,478,239 B2 | 11/2002 | Chung et al. | |
| 6,484,489 B1 | 11/2002 | Foust et al. | |
| 6,505,089 B1 | 1/2003 | Yang et al. | |
| 6,523,350 B1 | 2/2003 | Mancini et al. | |
| 6,546,732 B1 | 4/2003 | Young et al. | |
| 6,547,163 B1 | 4/2003 | Mansour et al. | |
| 6,564,831 B1 | 5/2003 | Sanoner et al. | |
| 6,634,175 B1 | 10/2003 | Kawata et al. | |
| 6,662,565 B2 | 12/2003 | Brundish et al. | |
| 6,672,654 B2 | 1/2004 | Yamada et al. | |
| 6,676,892 B2 | 1/2004 | Das et al. | |
| 6,692,037 B1 | 2/2004 | Lin | |
| 6,705,383 B2 | 3/2004 | Beeck et al. | |
| 6,711,898 B2 | 3/2004 | Laing et al. | |
| 6,715,292 B1 | 4/2004 | Hoke | |
| 6,718,770 B2 | 4/2004 | Laing et al. | |
| 6,755,024 B1 | 6/2004 | Mao et al. | |
| 6,756,561 B2 | 6/2004 | McGregor et al. | |
| 6,796,770 B2 | 9/2004 | Gigas et al. | |
| D498,825 S | 11/2004 | Fu | |
| 6,811,744 B2 | 11/2004 | Keicher et al. | |
| 6,834,505 B2 | 12/2004 | Al-Roub et al. | |
| 6,865,889 B2 | 3/2005 | Mancini et al. | |
| 6,898,938 B2 * | 5/2005 | Mancini | F23D 11/107 60/740 |
| 6,915,840 B2 | 7/2005 | Devine, II et al. | |
| 6,951,227 B1 | 10/2005 | Su | |
| 6,976,363 B2 | 12/2005 | McMasters et al. | |
| 6,993,916 B2 | 2/2006 | Johnson et al. | |
| 7,007,864 B2 | 3/2006 | Snyder et al. | |
| 7,062,920 B2 | 6/2006 | McMasters et al. | |
| 7,104,066 B2 | 9/2006 | Leen et al. | |
| 7,121,095 B2 | 10/2006 | McMasters et al. | |
| 7,144,221 B2 | 12/2006 | Giffin | |
| 7,146,725 B2 | 12/2006 | Kottilingam et al. | |
| 7,358,457 B2 | 4/2008 | Peng et al. | |
| 7,434,313 B2 | 10/2008 | Dasilva et al. | |
| 7,455,740 B2 | 11/2008 | Bostanjoglo et al. | |
| 7,540,154 B2 | 6/2009 | Tanimura et al. | |
| 7,559,202 B2 | 7/2009 | Prociw et al. | |
| 7,572,524 B2 | 8/2009 | Sabol et al. | |
| 7,654,000 B2 | 2/2010 | Prociw et al. | |
| 7,665,306 B2 | 2/2010 | Bronson et al. | |
| 7,712,313 B2 | 5/2010 | Kojovic et al. | |
| 7,748,221 B2 | 7/2010 | Patel et al. | |
| 7,815,847 B2 | 10/2010 | Gennaro et al. | |
| 7,827,800 B2 | 11/2010 | Stastny et al. | |
| 7,845,549 B2 | 12/2010 | Budinger | |
| 8,108,058 B2 | 1/2012 | Murrish et al. | |
| 8,256,221 B2 | 9/2012 | Rubio et al. | |
| 8,316,541 B2 | 11/2012 | Patel et al. | |
| 2001/0031920 A1 | 10/2001 | Kaufman et al. | |
| 2002/0003001 A1 * | 1/2002 | Weigl | B01D 11/00 137/806 |
| 2002/0085941 A1 | 7/2002 | Deevi et al. | |
| 2002/0125336 A1 | 9/2002 | Bretz | |
| 2002/0129606 A1 | 9/2002 | Wrubel et al. | |
| 2002/0152715 A1 | 10/2002 | Rotheroe | |

(56) References Cited

U.S. PATENT DOCUMENTS

| | | |
|---|---|---|
| 2003/0105538 A1 | 6/2003 | Wooten |
| 2003/0121266 A1 | 7/2003 | Modi et al. |
| 2003/0131474 A1 | 7/2003 | Kastrup et al. |
| 2003/0138679 A1* | 7/2003 | Prased .................. B01J 8/025 429/421 |
| 2004/0062636 A1 | 4/2004 | Mazzola et al. |
| 2004/0086635 A1 | 5/2004 | Grossklaus et al. |
| 2004/0101022 A1 | 5/2004 | Hardwicke et al. |
| 2004/0148937 A1 | 8/2004 | Mancini et al. |
| 2004/0200069 A1 | 10/2004 | Nguyen et al. |
| 2005/0028526 A1 | 2/2005 | Von Der Bank |
| 2005/0047914 A1 | 3/2005 | Tomberg |
| 2005/0144954 A1 | 7/2005 | Lemon et al. |
| 2005/0204769 A1 | 9/2005 | Oberley et al. |
| 2005/0205232 A1 | 9/2005 | Wang et al. |
| 2005/0235493 A1 | 10/2005 | Philip et al. |
| 2005/0257530 A1 | 11/2005 | Zupanc et al. |
| 2005/0262843 A1 | 12/2005 | Monty |
| 2005/0265828 A1 | 12/2005 | Horng et al. |
| 2005/0271507 A1 | 12/2005 | Muriithi et al. |
| 2006/0042083 A1 | 3/2006 | Baker et al. |
| 2006/0248898 A1 | 11/2006 | Buelow et al. |
| 2007/0017224 A1 | 1/2007 | Li et al. |
| 2007/0028595 A1 | 2/2007 | Mongia et al. |
| 2007/0028617 A1 | 2/2007 | Hsieh et al. |
| 2007/0028618 A1 | 2/2007 | Hsiao et al. |
| 2007/0028620 A1 | 2/2007 | McMasters et al. |
| 2007/0028624 A1 | 2/2007 | Hsieh et al. |
| 2007/0071902 A1 | 3/2007 | Dietrich et al. |
| 2007/0084047 A1 | 4/2007 | Lange et al. |
| 2007/0084049 A1 | 4/2007 | Wang et al. |
| 2007/0098929 A1 | 5/2007 | Dietrich et al. |
| 2007/0119177 A1 | 5/2007 | McMasters et al. |
| 2007/0141375 A1 | 6/2007 | Budinger et al. |
| 2007/0157616 A1 | 7/2007 | Hernandez et al. |
| 2007/0163263 A1 | 7/2007 | Thomson et al. |
| 2007/0169486 A1 | 7/2007 | Hernandez et al. |
| 2007/0205184 A1 | 9/2007 | Mazumder et al. |
| 2007/0207002 A1 | 9/2007 | Roh |
| 2007/0287027 A1 | 12/2007 | Justin et al. |
| 2008/0078080 A1 | 4/2008 | Patel et al. |
| 2008/0110022 A1 | 5/2008 | Brown et al. |
| 2008/0178994 A1 | 7/2008 | Qi et al. |
| 2008/0182017 A1 | 7/2008 | Singh et al. |
| 2008/0182107 A1 | 7/2008 | Lee |
| 2008/0314878 A1 | 12/2008 | Cai et al. |
| 2009/0032610 A1* | 2/2009 | Rosko .................. B05B 1/1627 239/11 |
| 2009/0113893 A1 | 5/2009 | Li et al. |
| 2009/0120504 A1* | 5/2009 | Andersson ........ B01L 3/502738 137/38 |
| 2009/0255256 A1 | 10/2009 | McMasters et al. |
| 2009/0255264 A1 | 10/2009 | McMasters et al. |
| 2010/0263382 A1 | 10/2010 | Mancini et al. |
| 2010/0307161 A1 | 12/2010 | Thomson et al. |
| 2011/0206533 A1 | 8/2011 | Lee et al. |
| 2011/0259976 A1 | 10/2011 | Tyler et al. |
| 2012/0047903 A1 | 3/2012 | Williams et al. |
| 2012/0151930 A1 | 6/2012 | Patel et al. |
| 2012/0186695 A1* | 7/2012 | Clusserath ............ B67C 3/2608 141/115 |
| 2012/0227408 A1 | 9/2012 | Buelow et al. |
| 2012/0228405 A1 | 9/2012 | Buelow et al. |

FOREIGN PATENT DOCUMENTS

| | | |
|---|---|---|
| CN | 102997280 A | 3/2013 |
| EP | 0019421 A2 | 11/1980 |
| EP | 0042454 A1 | 12/1981 |
| EP | 1413830 A2 | 4/2004 |
| EP | 1484553 A2 | 12/2004 |
| EP | 1806536 A1 | 7/2007 |
| EP | 2009257 A1 | 12/2008 |
| EP | 2397763 A1 | 12/2011 |
| FR | 2896303 A1 | 7/2007 |
| GB | 837500 A | 6/1960 |
| GB | 2437977 A | 11/2007 |
| JP | S51-138225 A | 11/1976 |
| JP | 5575535 A | 6/1980 |
| JP | 5841471 U | 3/1983 |
| JP | S60-126521 A | 7/1985 |
| JP | 62150543 U | 9/1987 |
| JP | 05-086902 A | 4/1993 |
| JP | S6-229553 A | 8/1994 |
| JP | 0714022 A | 1/1995 |
| JP | H08-285228 A | 11/1996 |
| JP | 10148334 A | 6/1998 |
| JP | 2798281 B2 | 9/1998 |
| JP | 11237047 A | 8/1999 |
| JP | H11-350978 A | 12/1999 |
| JP | 2000296561 A | 10/2000 |
| JP | 2000320836 A | 11/2000 |
| JP | 2001041454 A | 2/2001 |
| JP | 2002115847 A | 4/2002 |
| JP | 2002-520568 A | 7/2002 |
| JP | 2003106528 A | 4/2003 |
| JP | 2003129862 A | 5/2003 |
| JP | 2003515718 A | 5/2003 |
| JP | 2003214300 A | 7/2003 |
| JP | 2004168610 A | 6/2004 |
| JP | 2005076639 A | 3/2005 |
| JP | 2005106411 A | 4/2005 |
| JP | 2005337703 A | 12/2005 |
| JP | 2005344717 A | 12/2005 |
| JP | 2006524579 A | 11/2006 |
| JP | 2007046886 A | 2/2007 |
| JP | 2007155318 A | 6/2007 |
| JP | 2007183093 A | 7/2007 |
| JP | 3960222 B2 | 8/2007 |
| JP | 2008-008612 A | 1/2008 |
| JP | 2008069449 | 3/2008 |
| WO | 9855800 A1 | 12/1998 |
| WO | 2006079459 A1 | 8/2006 |
| WO | 2009/126701 A2 | 10/2009 |

OTHER PUBLICATIONS

N.F. Dubovkin, "Methods of Assessing Fuel and OII Quality", 1970, Plenum Publishing Corporation—Consultants Bureau, UDC 532.61:665.521.3, pp. 914-917.*

Li, D., "Encyclopedia of Microfluidics and Nanofluidics"—Capillary Flows, 2008, Springer, ISBN: 978-0-387-32468-5, pp. 192-196.*

Michael Anthony Benjamin et al., Mar. 15, 2013, U.S. Appl. No. 61/787,961.

Marie Mcmasters et al., Jun. 29, 2012, U.S. Appl. No. 61/666,644.

Michael Anthony Benjamin et al., Jun. 22, 2016, U.S. Appl. No. 15/107,282.

Joshua Tyler Mook et al., Jun. 22, 2016, U.S. Appl. No. 15/107,263.

Michael Tyler Mook et al., Mar. 15, 2013, U.S. Appl. No. 61/799,845.

Marie Ann McMasters et al., Jul. 10, 2014, U.S. Appl. No. 14/328,347.

Marie Ann McMasters et al., Jul. 30, 2008, U.S. Appl. No. 12/182,500.

David Allen Kastrup et al., May 15, 2008, U.S. Appl. No. 12/120,785.

Marie Ann McMasters et al., Apr. 6, 2009, U.S. Appl. No. 12/418,875.

Michael R. Johnson, Jan. 13, 2006, U.S. Appl. No. 11/332,532.

Liu et al., "RP of Si3 N4 Burner Arrays via Assembly Mould SDM", Rapid Prototyping, vol. No. 10, Issue No. 4, pp. 239-246, 2004.

U.S. Non-Final Office Action issued in connection with related U.S. Appl. No. 12/182,469 dated Feb. 4, 2009.

U.S. Non-Final Office Action issued in connection with related U.S. Appl. No. 11/332,532 dated Mar. 17, 2009.

U.S. Final Office Action issued in connection with related U.S. Appl. No. 11/332,532 dated Aug. 20, 2009.

U.S. Final Office Action issued in connection with related U.S. Appl. No. 12/182,469 dated Nov. 12, 2009.

U.S. Non-Final Office Action issued in connection with related U.S. Appl. No. 12/182,469 dated May 28, 2010.

U.S. Non-Final Office Action issued in connection with related U.S. Appl. No. 11/332,532 dated Feb. 18, 2011.

(56) References Cited

OTHER PUBLICATIONS

U.S. Non-Final Office Action issued in connection with related U.S. Appl. No. 12/120,785 dated Apr. 13, 2011.
U.S. Non-Final Office Action issued in connection with related U.S. Appl. No. 12/200,960 dated Apr. 29, 2011.
U.S. Non-Final Office Action issued in connection with related U.S. Appl. No. 12/182,500 dated Jun. 15, 2011.
U.S. Non-Final Office Action issued in connection with related U.S. Appl. No. 12/182,526 dated Jul. 5, 2011.
U.S. Non-Final Office Action issued in connection with related U.S. Appl. No. 12/182,485 dated Jul. 11, 2011.
U.S. Final Office Action issued in connection with related U.S. Appl. No. 12/200,960 dated Aug. 16, 2011.
U.S. Non-Final Office Action issued in connection with related U.S. Appl. No. 12/200,956 dated Sep. 15, 2011.
U.S. Non-Final Office Action issued in connection with related U.S. Appl. No. 12/120,797 dated Nov. 7, 2011.
U.S. Non-Final Office Action issued in connection with related U.S. Appl. No. 12/262,237 dated Nov. 7, 2011.
U.S. Final Office Action issued in connection with related U.S. Appl. No. 11/332,532 dated Nov. 8, 2011.
U.S. Non-Final Office Action issued in connection with related U.S. Appl. No. 12/262,225 dated Jan. 3, 2012.
U.S. Non-Final Office Action issued in connection with related U.S. Appl. No. 12/182,526 dated Jan. 17, 2012.
U.S. Non-Final Office Action issued in connection with related U.S. Appl. No. 12/412,512 dated Jan. 19, 2012.
U.S. Non-Final Office Action issued in connection with related U.S. Appl. No. 12/418,875 dated Jan. 31, 2012.
First Office Action and Search issued in connection with related CN Application No. 201480070681.7 dated Mar. 24, 2017.
Notification of Reasons for Refusal issued in connection with corresponding JP Application No. 2016-533696 dated Apr. 24, 2017.
Japanese Search Report issued in connection with corresponding JP Application No. 2016-533696 dated Apr. 27, 2017.
First Office Action and Search issued in connection with corresponding CN Application No. 201480065056.3 dated May 24, 2017.
PCT Invitation to Pay Additional Fees issued in connection with related PCT Application No. PCT/US2009/039085 dated Feb. 6, 2012
PCT Search Report and Written Opinion issued in connection with related PCT Application No. PCT/US2009/039100 dated Feb. 6, 2012
PCT Search Report and Written Opinion issued in connection with related PCT Application No. PCT/US2009/037224 dated Feb. 7, 2012
PCT Search Report and Written Opinion issued in connection with related PCT Application No. PCT/US2009/039894 dated Mar. 8, 2012
PCT Search Report and Written Opinion issued in connection with related PCT Application No. PCT/US2009/037101 dated Mar. 13, 2012
U.S. Final Office Action issued in connection with related U.S. Appl. No. 12/262,237 dated Mar. 15, 2012.
PCT Search Report and Written Opinion issued in connection with related PCT Application No. PCT/US2009/037148 dated Mar. 20, 2012
PCT Search Report and Written Opinion issued in connection with related PCT Application No. PCT/US2009/037221 dated Mar. 20, 2012
PCT Search Report and Written Opinion issued in connection with related PCT Application No. PCT/US2009/039928 dated Mar. 27, 2012
U.S. Non-Final Office Action issued in connection with related U.S. Appl. No. 11/332,532 dated Apr. 6, 2012.
U.S. Final Office Action issued in connection with related U.S. Appl. No. 12/412,512 dated May 23, 2012.
U.S. Non-Final Office Action issued in connection with related U.S. Appl. No. 12/412,523 dated May 24, 2012.
U.S. Final Office Action issued in connection with related U.S. Appl. No. 12/418,875 dated May 25, 2012.
PCT Invitation to Pay Additional Fees issued in connection with related PCT Application No. PCT/US2009/039385 dated Jun. 6, 2012
U.S. Non-Final Office Action issued in connection with related U.S. Appl. No. 12/418,889 dated Jun. 13, 2012.
U.S. Non-Final Office Action issued in connection with related U.S. Appl. No. 12/418,901 dated Jun. 18, 2012.
U.S. Final Office Action issued in connection with related U.S. Appl. No. 12/262,225 dated Jun. 29, 2012.
PCT Search Report and Written Opinion issued in connection with related PCT Application No. PCT/US2009/039085 dated Jul. 3, 2012
U.S. Final Office Action issued in connection with related U.S. Appl. No. 12/120,797 dated Jul. 23, 2012.
U.S. Final Office Action issued in connection with related U.S. Appl. No. 12/182,526 dated Jul. 24, 2012.
U.S. Final Office Action issued in connection with related U.S. Appl. No. 11/332,532 dated Aug. 3, 2012.
U.S. Non-Final Office Action issued in connection with related U.S. Appl. No. 12/200,960 dated Aug. 13, 2012.
PCT Search Report and Written Opinion issued in connection with related PCT Application No. PCT/US2009/39385 dated Nov. 22, 2012.
U.S. Non-Final Office Action issued in connection with related U.S. Appl. No. 11/332,532 dated Jan. 3, 2013.
Unofficial English Translation of Japanese Office Action issued in connection with corresponding JP Application No. 2011504037 dated Mar. 26, 2013.
Unofficial English Translation of Japanese Office Action issued in connection with corresponding JP Application No. 2011504035 dated Apr. 2, 2013.
Unofficial English Translation of Japanese Office Action issued in connection with corresponding JP Application No. 2011504038 dated Apr. 2, 2013.
U.S. Final Office Action issued in connection with related U.S. Appl. No. 11/332,532 dated Apr. 29, 2013.
Unofficial English Translation of Japanese Office Action issued in connection with corresponding JP Application No. 2011504059 dated May 28, 2013.
Unofficial English Translation of Japanese Office Action issued in connection with corresponding JP Application No. 2011504034 dated Aug. 6, 2013.
U.S. Non-Final Office Action issued in connection with related U.S. Appl. No. 12/412,512 dated Sep. 26, 2013.
Unofficial English Translation of Japanese Notice of Allowance Office Action issued in connection with related JP Application No. 2011504037 dated Oct. 22, 2013.
Unofficial English Translation of Japanese Notice of Allowance Office Action issued in connection with related JP Application No. 2011504035 dated Nov. 12, 2013.
U.S. Notice of Allowance Office Action issued in connection with related U.S. Appl. No. 12/412,512 dated Apr. 30, 2014.
Unofficial English Translation of Japanese Office Action issued in connection with related JP Application No. 2011504059 dated Jun. 3, 2014.
Unofficial English Translation of Japanese Office Action issued in connection with corresponding JP Application No. 2011504034 dated Aug. 5, 2014.
Unofficial English Translation of Japanese Notice of Allowance Office Action issued in connection with related JP Application No. 2011504059 dated Mar. 3, 2015.
Unofficial English Translation of Japanese Notice of Allowance Office Action issued in connection with related JP Application No. 2011504034 dated Jun. 30, 2015.
PCT Invitation to Pay Additional Fees issued in connection with corresponding PCT Application No. PCT/US2014/066966 dated Aug. 20, 2015.

(56) References Cited

OTHER PUBLICATIONS

PCT Search Report and Written Opinion issued in connection with related PCT Application No. PCT/US2014/072023 dated Sep. 2, 2015.
PCT Search Report and Written Opinion issued in connection with related PCT Application No. PCT/US2014/072028 dated Sep. 2, 2015.
Unofficial Translation of Notification of Reasons for Refusal and Search issued in connection with corresponding JP Application No. 2016-533696 dated Apr. 18, 2017.
PCT Search Report and Written Opinion issued in connection with corresponding PCT Application No. PCT/US2014/66966 dated Oct. 12, 2015.
First Office Action and Search issued in connection with corresponding CA Application No. 2,931,246 dated Feb. 17, 2017.
Second Office Action and Search issued in connection with corresponding CA Application No. 2,931,246 dated Nov. 9, 2017.
First Office Action and Search issued in connection with corresponding EP Application No. 14 868 715.5 dated Sep. 19, 2017.
Mcmasters, M.A., et al., Fuel nozzle assembly and method of fabricating the same, GE co-pending U.S. Appl. No. 61/666,644, filed Jun. 29, 2012.
Barnhart, D.R., et al., Gas turbine engine fuel injector monolithic fuel nozzle tip section, GE co-pending U.S. Appl. No. 61/799,845, filed Mar. 15, 2013.
Benjamin, M.A., et al., Gas turbine engine fuel injector monolithic fuel nozzle tip, GE co-pending U.S. Appl. No. 61/787,961, filed Mar. 15, 2013.

\* cited by examiner

FUEL NOZZLE WITH FLUID LOCK AND PURGE APPARATUS

BACKGROUND

Embodiments of the present invention relate to gas turbine engine fuel nozzles and, more particularly, to apparatus for draining and purging gas turbine engine fuel nozzles.

Aircraft gas turbine engines include a combustor in which fuel is burned to input heat to the engine cycle. Typical combustors incorporate one or more fuel injectors whose function is to introduce atomized, liquid fuel into an air flow stream at the combustor inlet so that it can be burned effectively to produce necessary heat for the cycle.

Staged combustion systems have been developed to limit the production of undesirable combustion product components such as oxides of nitrogen (NOx), unburned hydrocarbons (HC), and carbon monoxide (CO). Other factors that influence combustor design are the desires of users of gas turbine engines for efficient, low cost operation, which translates into a need for reduced fuel consumption while at the same time maintaining or even increasing engine output. As a consequence, important design criteria for aircraft gas turbine engine combustion systems include provisions for high combustion temperatures, in order to provide high thermal efficiency under a variety of engine operating conditions, as well as minimizing undesirable combustion conditions that contribute to the emission of particulates, and to the emission of undesirable gases, and to the emission of combustion products that are precursors to the formation of photochemical smog.

In a staged combustion system, the nozzles of the combustor are operable to selectively inject fuel through two or more discrete stages, each stage being defined by individual fuel flowpaths within the fuel nozzle. For example, the fuel nozzle may include a pilot stage that operates continuously, and a main stage that only operates at higher engine power levels. The fuel flowrate may also be variable within each of the stages.

A significant concern in this type of fuel nozzle is the formation of carbon (or "coke") deposits when a liquid hydrocarbon fuel is exposed to high temperatures in the presence of oxygen. This process is referred to as "coking" and is generally a risk when temperatures exceed about 177° C. (350° F.). When normal staged operations stops flow to one of the aforementioned stages, a volume of fuel will continue to reside in the fuel nozzle and can be heated to coking temperatures. The areas of highest concern relative to coking are small main injection orifices within the fuel nozzle, where the fuel increases temperature most rapidly when main fuel flow is off due to staging. Small amounts of coke interfering with fuel flow through these orifices can make a large difference in fuel nozzle performance. Eventually, build-up of carbon deposits can block fuel passages sufficiently to degrade fuel nozzle performance or prevent the intended operation of the fuel nozzle to the point where cleaning or replacement is necessary to prevent adverse impacts to other engine hot section components and/or restore engine cycle performance.

Prior art designs have addressed this problem by purging the complete main fuel circuit of liquid fuel when the main stage was not operating. While effective, this type of complete purge requires motive pressure differentials with magnitude proportional to the length of the passage to be purged and could cause relatively long delays in refilling the main fuel circuit when high power operation was again desired.

Accordingly, it would be desirable to have a method of purging a portion of a fuel nozzle stage when that stage is not in operation.

BRIEF SUMMARY OF THE INVENTION

This need is addressed by embodiments of the present invention, which provides a staged fuel nozzle incorporating a fluid lock, a fuel purging port configuration, or both, arranged to purge excess fuel from one of the fuel nozzle stages and therefore avoid coking of fuel passages inside the fuel nozzle, while facilitating quick changeover between staged and non-staged operation.

According to one aspect of the invention, a fuel nozzle apparatus has a centerline axis, and includes: a main fuel injector including an enclosed interior volume in fluid communication with a plurality of fuel ports configured to discharge fuel therefrom; a main fuel conduit disposed upstream of the main fuel injector and configured to supply liquid fuel to the interior volume; and a fluid lock disposed between the main fuel conduit and the main fuel injector, the fluid lock including a plurality of parallel capillary channels.

According to another aspect of the invention, each capillary channel has a cross-sectional flow area of 0.002 square inches or less.

According to another aspect of the invention, a cross-sectional flow area of the main fuel conduits significantly greater than a cross-sectional flow area of one of the capillary channels.

According to another aspect of the invention, the main fuel injector is of annular form; and a pilot fuel injector is disposed coaxially within the main fuel injector.

According to another aspect of the invention, the apparatus further includes an annular venturi surrounding the pilot fuel injector; and a radial array of outer swirl vanes interconnecting the pilot fuel injector and the venturi.

According to another aspect of the invention, the apparatus further includes an annular outer body surrounding the main fuel injector, and having a generally cylindrical exterior surface including an array of spray wells formed therein, each spray well being aligned with one of the main fuel ports.

According to another aspect of the invention, some of the spray wells incorporate a scarf including a ramped portion of the exterior surface which is oriented at an acute angle to the centerline axis.

According to another aspect of the invention, the spray wells are arranged as: a first group which do not incorporate scarfs; and a second group which each incorporate a scarf including a ramped portion of the exterior surface which is oriented at an acute angle to the centerline axis, wherein the spray wells of the second group alternate with the spray wells of the second group around the periphery of the outer body.

According to another aspect of the invention, the spray wells of the second group are oriented at an acute angle to the centerline axis, in a downstream direction.

According to another aspect of the invention, the spray wells are arranged as: a first group which each incorporate a scarf including a ramped portion of the exterior surface which is oriented in an upstream direction, at an acute angle to the centerline axis; and a second group which each incorporate a scarf including a ramped portion of the exterior surface which is oriented in a downstream direction, at an acute angle to the centerline axis, wherein the spray wells of the second group alternate with the spray wells of the second group around the periphery of the outer body.

According to another aspect of the invention, a fuel nozzle apparatus includes: a centrally-located pilot fuel injector; a pilot fuel conduit coupled to pilot fuel injector; an annular venturi surrounding the pilot fuel injector; a radial array of outer swirl vanes interconnecting the pilot fuel injector and the venturi; an annular main fuel injector surrounding the pilot fuel injector, including an enclosed interior volume in fluid communication with plurality of fuel ports configured to discharge fuel therefrom; an annular outer body surrounding the main fuel injector, venturi, and pilot fuel injector, and having a generally cylindrical exterior surface, including an array of spray wells formed therein, each spray well being aligned with one of the main fuel ports), wherein some of the spray wells incorporate a scarf including a ramped portion of the exterior surface which is oriented at an acute angle to the centerline axis; a main fuel conduit disposed upstream of the main fuel injector and configured to supply liquid fuel to the interior volume; and a blocking device disposed between the main fuel conduit and the main fuel injector, the fluid lock comprising a plurality of parallel capillary channels.

According to another aspect of the invention, the blocking device includes a fluid lock having a plurality of parallel capillary channels.

According to another aspect of the invention, the apparatus further includes: a fuel system operable to supply a flow of liquid fuel; a pilot valve which is coupled to the fuel system and to the pilot fuel conduit; and a main valve which is coupled to the fuel system and to the main fuel conduit.

BRIEF DESCRIPTION OF THE DRAWINGS

Embodiments of the present invention may be best understood by reference to the following description taken in conjunction with the accompanying drawing figures in which.

DETAILED DESCRIPTION

Generally, embodiments of the present invention provide a staged fuel nozzle incorporating a fluid lock, a fuel purging port configuration, or both, arranged to purge excess fuel from one of the fuel nozzle stages and therefore avoid coking of fuel passages inside the fuel nozzle, while facilitating quick changeover between staged and non-staged operation.

Figure 1:
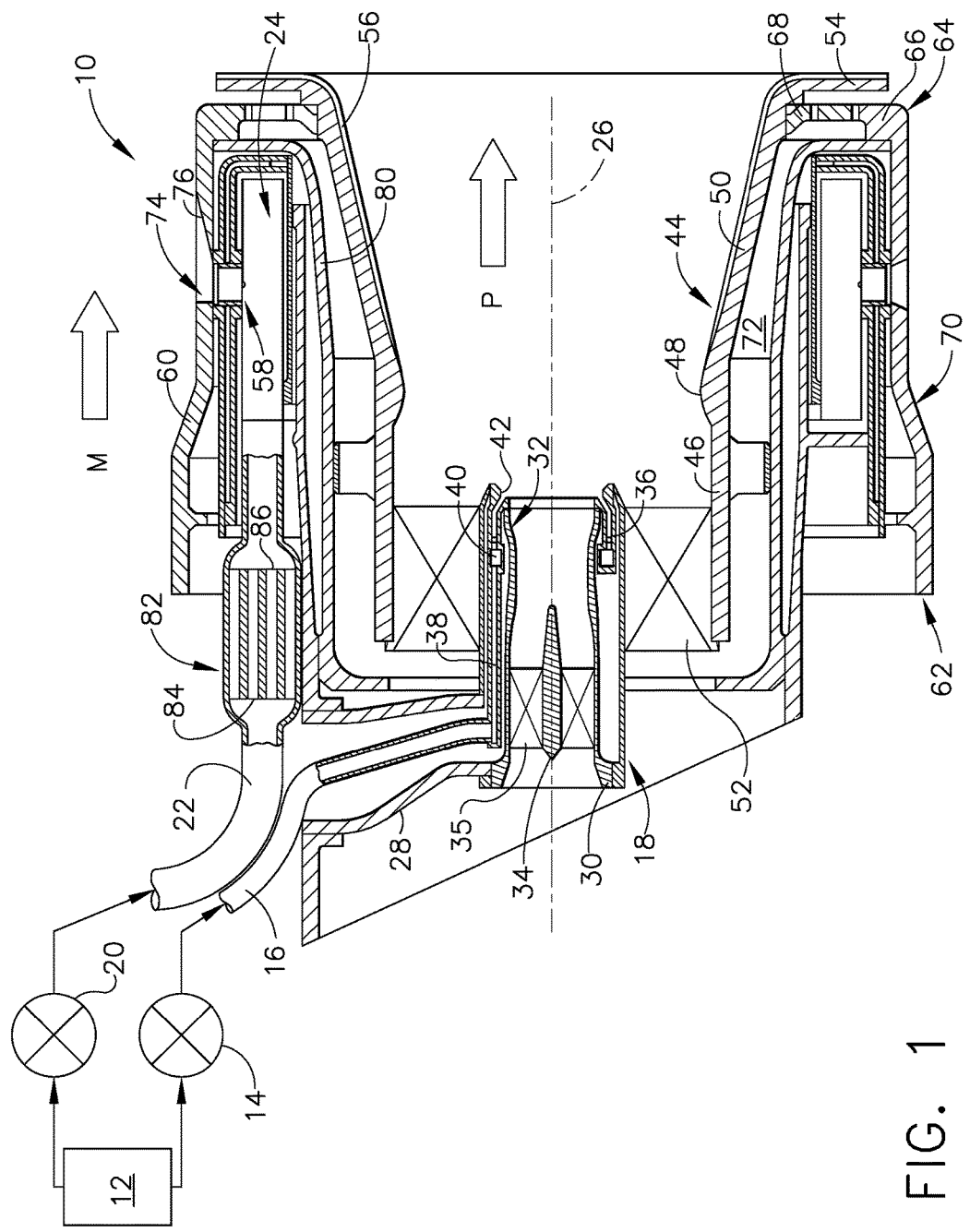
FIG. 1 is a schematic cross-sectional view of a gas turbine engine fuel nozzle incorporating a fluid lock constructed according to an aspect of the present invention.

Now, referring to the drawings wherein identical reference numerals denote the same elements throughout the various views, FIG. 1 depicts an exemplary fuel nozzle 10 of a type configured to inject liquid hydrocarbon fuel into an airflow stream of a gas turbine engine combustor (not shown). The fuel nozzle 10 is of a "staged" type meaning it is operable to selectively inject fuel through two or more discrete stages, each stage being defined by individual fuel flowpaths within the fuel nozzle 10. The fuel flowrate may also be variable within each of the stages.

The fuel nozzle 10 is connected to a fuel system 12 of a known type, operable to supply a flow of liquid fuel at varying flowrates according to operational need. The fuel system supplies fuel to a pilot valve 14 which coupled to a pilot fuel conduit 16, which is in turn coupled to a pilot fuel injector 18 of the fuel nozzle 10. The fuel system 12 also supplies fuel to a main valve 20 which is coupled to a main fuel conduit 22, which in turn supplies a main fuel injector 24.

For purposes of description, reference will be made to a centerline axis 26 of the fuel nozzle 10 which is generally parallel to a centerline axis of the engine (not shown) in which the fuel nozzle 10 would be used.

The pilot fuel injector 18 is disposed at an upstream end of the fuel nozzle 10, aligned with the centerline axis 26 and physically supported by a strut 28. In this example the pilot fuel injector 18 is of a type known as "prefilming air blast", "pure air blast," or "PAB." Various types of pilot fuel injectors are known and may be substituted for the PAB pilot. The illustrated pilot fuel injector 18 includes a generally cylindrical, axially-elongated, pilot centerbody 30. The pilot centerbody 30 is double-walled and defines a central bore 32. Disposed within the central bore 32 is a center swirler comprising an axially-elongated swirler centerbody 34 and a radial array of center swirl vanes 35. The center swirl vanes 35 are shaped and oriented to induce a swirl into air flow passing through the center swirler.

A pilot fuel cartridge 36 is disposed with the double walls of the pilot centerbody 30. The pilot fuel cartridge 36 includes an axial feed passage 38 extending between the pilot fuel conduit 16 located in the strut 28, and an annular pilot feed ring 40. An aft end of the pilot fuel cartridge 36 communicates with an open aft end of the double walls of the pilot centerbody 30, cooperating to define a filming exit structure 42.

An annular venturi 44 surrounds the pilot fuel injector 18. It includes, in axial sequence: a generally cylindrical upstream section 46, a throat 48 of minimum diameter, and a downstream diverging section 50. A radial array of outer swirl vanes 52 defining an outer air swirler extend between the pilot centerbody 30 and the venturi 44. The outer swirl vanes 52 physically support the pilot fuel injector 18 in cooperation with the strut 28. The outer swirl vanes 52 are shaped and oriented to induce a swirl into air flow passing through the outer air swirler. The bore of the venturi 44 defines a flowpath for a pilot air flow, generally designated "P", through the fuel nozzle 10. A heat shield 54 in the form of an annular, radially-extending plate may be disposed at an aft end of the diverging section 50. As illustrated, a thermal barrier coating (TBC) 56 of a known type may be applied on the surface of the heat shield 54 and/or the diverging section 50.

The main fuel injector 24 which is annular in form surrounds the venturi 44. The main fuel injector 24 defines an enclosed interior volume communicating with a radial array of main fuel ports 58 through which fuel is discharged during engine operation. The main fuel injector 24 is supplied with fuel by the main fuel conduit 22.

An annular outer body 60 surrounds the main fuel injector 24, venturi 44, and pilot fuel injector 18, and defines the outer extent of the fuel nozzle 10. The pilot fuel injector 18, venturi 44, main fuel injector 24, and outer body 60 are all coaxial with each other. A forward end 62 of the outer body 60 is joined to a stem housing component (not shown) when assembled. An aft end 64 of the outer body 60 may include an annular, radially-extending baffle 66 incorporating cooling holes 68 directed at the heat shield 54. Extending between the forward and aft ends 62, 64 is a generally cylindrical exterior surface 70 which in operation is exposed to a mixer airflow, generally designated "M." The outer body 60 defines a secondary flowpath 72, in cooperation with the venturi 44 and an inner body 80 that is described below. Air passing through this secondary flowpath 72 is discharged through the cooling holes 68.

Figure 2:
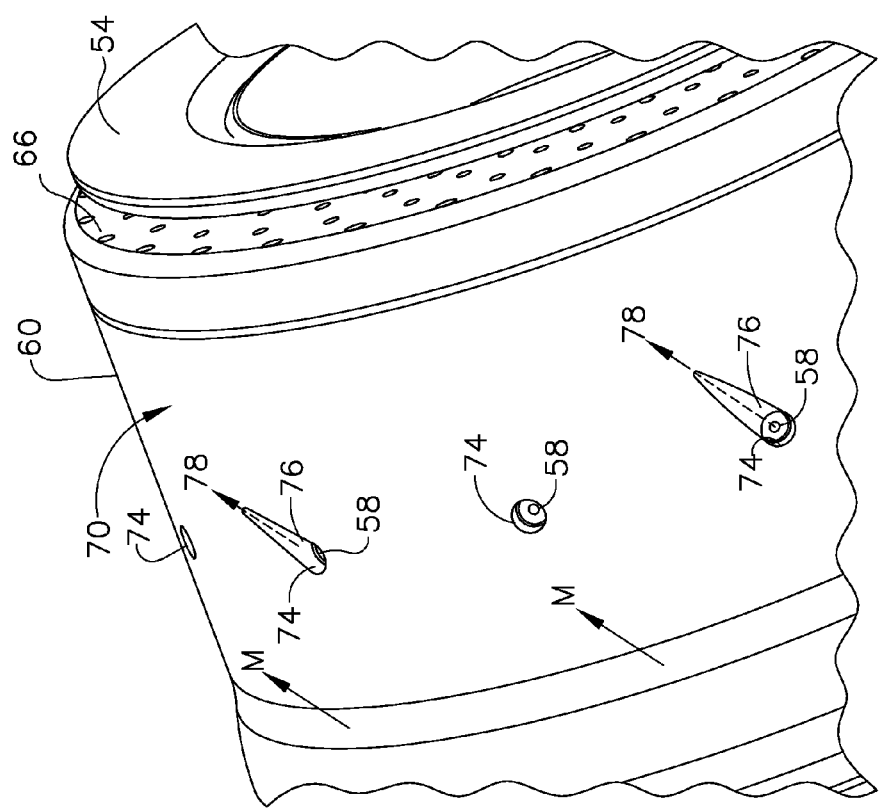
FIG. 2 is an exterior perspective view of the fuel nozzle of FIG. 1.

As best seen in FIG. 2, the exterior surface 70 of the outer body 60 includes an array of recesses or openings referred to as "spray wells" 74 formed therein. Each of the spray wells 74 is aligned with one of the main fuel ports 58.

The spray wells 74 may be configured to help purge fuel from the main fuel injector 24. In the illustrated example, some of the spray wells 74 are simple circular openings in plan view, with cylindrical walls. Other spray wells 74 incorporate a "scarf" comprising a ramped portion of the exterior surface 70. When viewed in cross-section as seen in FIG. 1, the scarf 76 has its greatest radial depth (measured relative to the exterior surface 70) at its interface with the associated main fuel port 58 and ramps or tapers outward in radial height, joining the exterior surface 70 at some distance away from the main fuel port 58. In plan view, as seen in FIG. 2, the scarf 76 extends away from the main fuel port 58 along a line 78 and tapers in lateral width to a minimum width at its distal end. The direction that the line 78 extends defines the orientation of the scarf 76. The scarf may be oriented at an acute angle to the centerline axis 26. The scarf 76 shown in FIG. 2 is oriented in a downstream direction and thus may be referred to as a "downstream" scarf, as it is parallel to a streamline of the rotating or swirling mixer airflow M, oriented at an acute angle to the centerline axis 26, and has its distal end located downstream from the associated main fuel port 58 relative to the mixer airflow M. As will be explained in more detail below, the presence or absence of the scarf 76 and orientation of the scarf 76 determines the static air pressure present at the associated main fuel port 58 during engine operation.

In addition to the basic elements described above, the fuel nozzle 10 may include other features to perform such functions as structural support, thermal insulation, and so forth. For example, as shown in FIG. 1, an annular main ring support 178 may be connected to the strut 28 and serve as a mechanical connection between the main fuel injector 24 and stationary mounting structure such as a fuel nozzle stem (not shown). An annular inner body 80 surrounding the venturi 44 may serve as a radiant heat shield and also help define the boundaries of the secondary flowpath 72.

Figure 3:
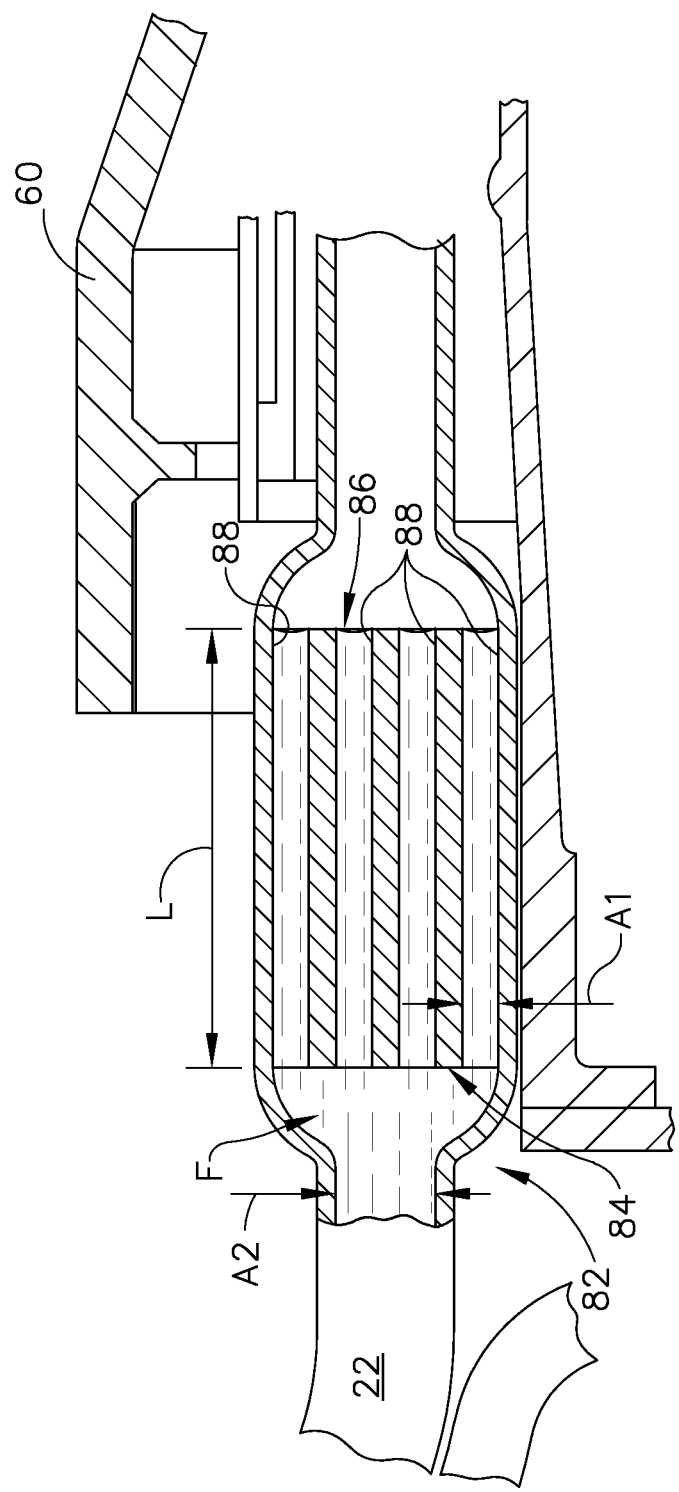
FIG. 3 is an enlarged view of a fluid lock shown in FIG. 1.

A fluid lock 82 may be incorporated into the main fuel conduit 22 between the main valve 20 and the main fuel injector 24. As shown in FIGS. 1 and 3, the fluid lock 82 has an upstream end 84 and a downstream end 86. An axial length "L" is defined between the upstream and downstream ends 84 and 86. The length L is selected to suit a particular application and is discussed in more detail below. The fluid lock 82 includes a plurality of parallel capillary channels 88 extending between the upstream and downstream ends 84 and 86.

Each of the capillary channels 88 has a cross-sectional flow area "A1." In accordance with known principles, the area A1 is selected considering the physical properties of the intended liquid fuel, and the material composition of the fluid lock 82, such that a capillary meniscus will remain intact across each capillary passage 88 during expected engine operating conditions (e.g. at selected temperature and acceleration conditions). This is the fundamental meaning of "capillary" as used herein. As a practical example, the capillary channels 88 would have a diameter of about 1.27 mm (0.05 in) or less, corresponding to a flow area of about 1.3 mm$^2$ (0.002 in$^2$), where the intended liquid fuel is conventional Jet-A fuel (ASTM D1655) at temperatures ranging from ambient to 177° C. (350° F.). It is noted that the capillary channels 88 may have a noncircular cross-sectional shape.

The number of capillary channels 88 is selected to permit a desired fuel flowrate through the fluid lock 82 at appropriate fuel supply pressures. If desired, the number of capillary channels 88 may be selected such that the pressure loss across the fluid lock 82 is approximately equal to the pressure loss across an equivalent length of the main fuel conduit 22 having a cross-sectional flow area "A2," which is typically significantly greater than the flow area A1.

The exemplary fuel nozzle 10 illustrated and described herein may be an assembly of various parts or elements. Alternatively, all or a portion of the fuel nozzle 10 or lesser subassemblies or components may be of unitary, one-piece, or monolithic configuration, and may be manufactured utilizing a rapid manufacturing process such as Direct Metal Laser Sintering (DMLS) or Direct Metal Laser Melting (DMLM).

The operation of the fuel nozzle 10 will now be explained relative to different engine operating conditions, with the understanding that a gas turbine engine requires more heat input and thus more fuel flow during high-power operation and less heat input and thus less fuel flow during low-power operation. During some operating conditions, both the pilot and main valves 14 and 20 are open. Liquid fuel flows under pressure from the pilot valve 14 through the pilot fuel conduit 16 into the pilot fuel cartridge 36 and is discharged into the pilot airflow P via the filming exit structure 42. The fuel subsequently atomizes and is carried downstream where it burns in the combustor (not shown). Liquid fuel also flows under pressure from the main valve 20 through the main fuel conduit 22, through the fluid lock 82 (if present) into the main fuel injector 24 and is discharged into the mixer airflow M via the main fuel ports 58. The fuel subsequently atomizes, is carried downstream, and burns in the combustor (not shown).

In a particular operating condition known as "pilot-only operation", the pilot fuel injector 18 continues to operate and the pilot valve 14 remains open, but the main valve 20 is closed. Initially after the main valve 20 is closed, valve downstream pressure rapidly equalizes with the prevailing air pressure in the mixer airflow M and fuel flow through the main fuel ports 58 stops. If the fuel were to remain in the main fuel injector 24 it would be subject to coking as described above. At this point, the action of a purge process, such as the configuration of spray well scarfs described below, may act to positively evacuate the fuel from the fuel nozzle 10, beginning at the main fuel ports 58 and moving upstream.

When fuel remaining at the downstream end 86 of the fluid lock 82 is finally purged, the purge process will effectively terminate. A volume of fuel "F" will be contained in the main fuel conduit 22 between the main valve 20 and the downstream end 86 of the fluid lock 82. More specifically, small surface tension forces of the fuel F and its adhesion to the walls of the capillary channels 88 prevent the exchange of air and fuel F at the air-liquid interface. Confining the fuel F as small fluid columns within the stationary boundaries of the capillary channels 88 reduces the mass-related forces that can be generated by the dense fuel F thereby permitting small surface tension forces to keep the fuel F in check within the confines of the capillary channels 88 of the fluid lock 82. Stated another way, a volume of fuel is positively "trapped" between the closed main valve 20 and the fluid lock 82.

At this point, the only process by which fuel F can exit the fluid lock 82 is evaporation, beginning at the downstream end 86 and progressing upstream. If the fuel F were to clear the upstream end 84 of the fluid lock 82, there may be a tendency to drain the main fuel conduit 22, refilling the fluid lock 82 and starting a cycle of draining and filling. To avoid this situation, the length L of the fluid lock 82 may be selected based on a known or estimated evaporation rate, to ensure that evaporation does not cause the fuel-air interface to move upstream of the upstream end 84 of the fluid lock 82 for at least a selected time interval.

The fluid lock 82 is useful in a fuel nozzle 10 whenever there is a desire to isolate or cut off liquid flow at a point downstream of a mechanical valve. By purging only the portions of the fuel nozzle 10 necessary to avoid excessive coking, a relatively small volume of fuel needs to be delivered to re-fill the fuel passages and commence discharging fuel from the main fuel ports 58 when required. This lowers combustor response time and improves engine operability as compared to a complete purge of the fuel nozzle 10 and conduit 22 as used in some prior art designs. Partial purging could be implemented using a valve (not shown) at the location of the fluid lock 82, but the fluid lock 82 has the advantage that it does not include any moving parts or sealing boundaries.

The purge method and configuration will now be explained in more detail. As noted above, the main fuel injector 24 communicates with an array of main fuel ports 58, each of which communicates with a single spray well 74 on the periphery of the outer body 60. The mixer airflow M exhibits "swirl," that is, its velocity has both axial and tangential components relative to the centerline axis 26. As shown in FIG. 2, the spray wells 74 may be arranged such that alternating main fuel ports 58 are exposed to different static pressures. For example, each of the main fuel ports 58 not associated with a scarf 76 is exposed to the generally prevailing static pressure in the mixer airflow M. For purposes of description these are referred to herein as "neutral pressure ports." Each of the main fuel ports 58 associated with a "downstream" scarf 76 is exposed to reduced static pressure relative to the prevailing static pressure in the mixer airflow M. For purposes of description these are referred to herein as "low pressure ports." While not shown, it is also possible that one or more scarfs 76 could be oriented opposite to the orientation of the downstream scarfs 76. These would be "upstream scarfs" and the associated main fuel ports 58 would be exposed to increased static pressure relative to the prevailing static pressure in the mixer airflow M. For purposes of description these are referred to herein as "high pressure ports."

Figure 4:
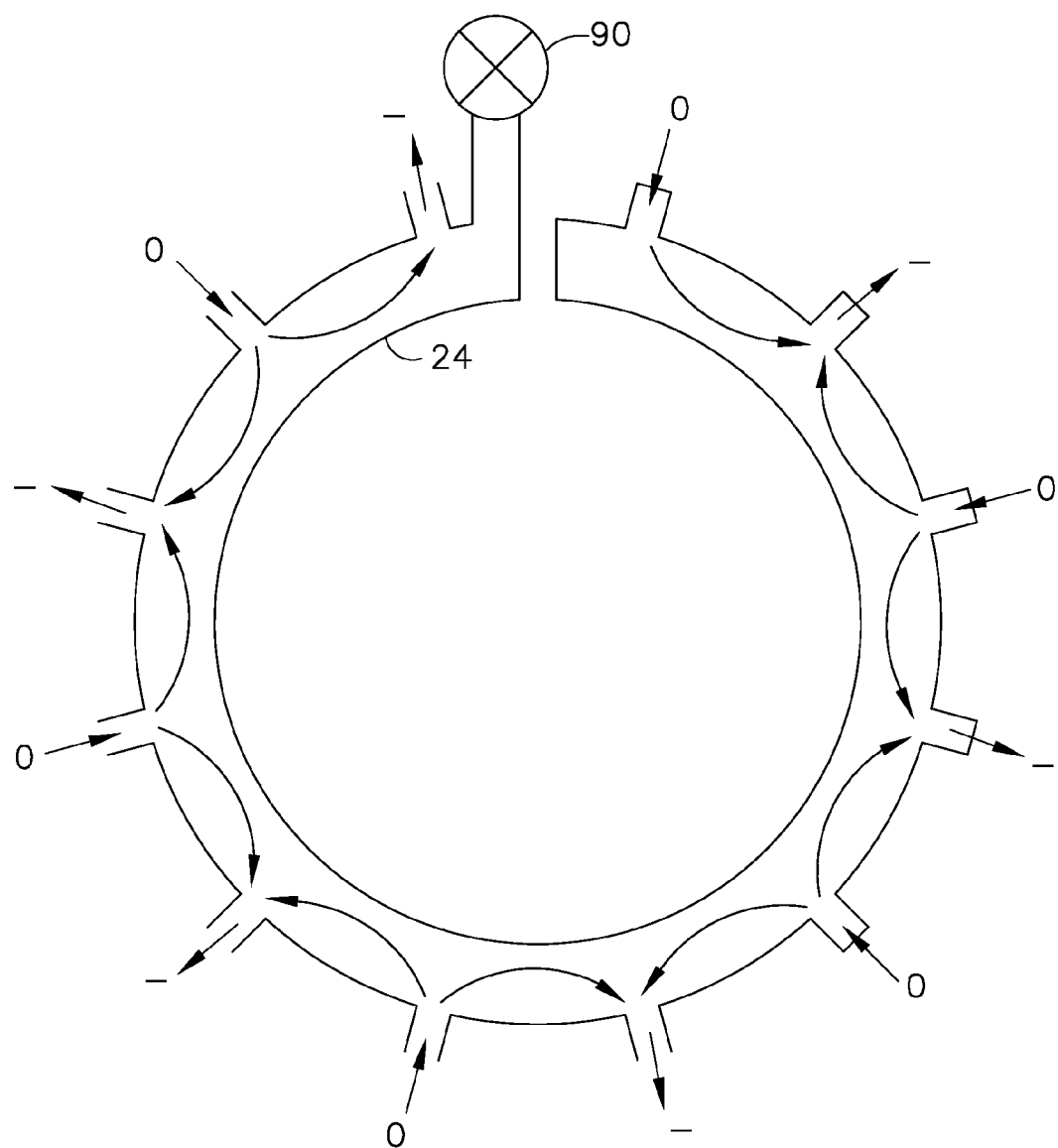
FIG. 4 is a schematic view of the fuel flow path in the fuel nozzle shown in FIG. 1.

Referring to FIG. 4, neutral pressure ports (marked with a zero) may alternate with low pressure ports (marked with a minus sign). The local static pressure differences between adjacent ports drive flow of the remaining fuel F to evacuate the main fuel injector 24. As shown by the arrows in the figure air enters the neutral ports (0), driving the fuel to flow tangentially in the main fuel injector 24 from the neutral ports (0) to the low-pressure ports (−), and exits the low-pressure ports (−). This rapidly purges the main fuel injector 24 and evacuates fuel from the portion of the main fuel conduit 22 downstream of the fluid lock 82. The ports and scarfs may be arranged in any configuration that will generate a pressure differential effective to drive a port-to-port purge. For example, positive pressure ports could alternate with neutral pressure ports, or positive pressure ports could alternate with negative pressure ports.

This purging configuration and action is useful even without the fluid lock 82. However, it is especially useful for a partial purge in combination with the fluid lock 82 or some other device effective to block complete purging. As noted above, a valve could be used for this purpose. A blocking device 90 representative of either the fluid lock 82 or a functionally equivalent device is shown schematically in FIG. 4.

Embodiments described above have several advantages over the prior art. It provides a means to maintain a portion of a main circuit full of fuel from the main valve 20 downstream to the beginning of the main fuel injector 24 while still permitting the main fuel injector 24 to be purged when main fuel flow is off. This reduces the time lag for main injection associated with refilling the total volume of the main circuit after a complete purge as used in prior art designs.

Because fuel is purged from the main fuel injector 24 only and a port-to-port flowpath is used, the driving purge pressure can be greatly reduced compared to a complete purge, thereby reducing the amount of hot purge air flowing thru the main fuel ports 58 and the main ring supply circuit. This reduces any added heat load imposed by purge air flow in the aft passages of the fuel nozzle 10 and provides benefit at the main fuel ports 58, leading to reduced coke formation at this location.

The lowered heat loads associated with partial purge will also reduce thermally induced stresses in fuel passages and local structural members within the tip of the fuel nozzle 10. The effects of degrading material properties at temperature are reduced and overall nozzle life increases.

Furthermore, the main ring port-to-port purge is expected to perform the purge function in a highly consistent manner since purge circuit length is relatively short and since the main fuel injector 24 is circumferentially symmetric, meaning that the orientation of fuel nozzle installation is expected to have minimal effect on purge performance.

The foregoing has described a fluid lock and purge apparatus for a gas turbine engine fuel nozzle, and a method of making and using the same. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends any novel one, or any novel combination, of the features disclosed in this specification (including any accompanying claims, abstract and drawings), or to any novel one, or any novel combination, of the steps of any method or process so disclosed.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A fuel nozzle apparatus having a centerline axis, and comprising:
a main fuel injector including an enclosed interior volume in fluid communication with a plurality of fuel ports configured to discharge fuel therefrom;
a main fuel conduit disposed upstream of the main fuel injector and configured to supply liquid fuel to the interior volume;
a fluid lock disposed within the main fuel conduit, the fluid lock comprising a plurality of parallel capillary channels, the fluid lock comprising an upstream end, a downstream end, and an axial length defined between the upstream end and the downstream end; and
wherein the fluid lock is positioned such that the fluid lock is spaced from the main fuel injector by a portion of the main fuel conduit, the main fuel conduit having a cross-sectional flow area greater than a cross-sectional flow area of each capillary channel of the plurality of parallel capillary channels; and
each capillary channel is configured such that a capillary meniscus will remain intact across each capillary channel during selected operating conditions.

2. The apparatus of claim 1, wherein the cross-sectional flow area of each capillary channel of the plurality of parallel capillary channels is 0.002 square inches or less.

3. The apparatus of claim 1,
wherein the plurality of parallel capillary channels extends along the axial length.

4. The apparatus of claim 1 wherein:
the main fuel injector is of annular form;
a pilot fuel injector is disposed coaxially within the main fuel injector, and
each capillary channel of the plurality of capillary channels has a noncircular cross-sectional shape.

5. The apparatus of claim 4 further comprising:
an annular venturi surrounding the pilot fuel injector; and
a radial array of outer swirl vanes interconnecting the pilot fuel injector and the venturi.

6. The apparatus of claim 1 further comprising an annular outer body surrounding the main fuel injector, and having a generally cylindrical exterior surface including an array of spray wells formed therein, each spray well being aligned with one of the fuel ports.

7. The apparatus of claim 6 wherein some of the spray wells incorporate a scarf comprising a ramped portion of the exterior surface which is oriented at an acute angle to the centerline axis, the scarf interfacing with one of the plurality of fuel ports, and
wherein the scarf has its greatest radial depth relative to the exterior surface at its interface with the fuel port of the plurality of fuel ports.

8. The apparatus of claim 6 wherein the spray wells are arranged as:
a first group which do not incorporate scarfs; and
a second group which each incorporate a scarf comprising a ramped portion of the exterior surface which is oriented at an acute angle to the centerline axis, wherein the spray wells of the first group alternate with the spray wells of the second group around the periphery of the outer body.

9. The apparatus of claim 8 wherein the spray wells of the second group are oriented at an acute angle to the centerline axis, in a downstream direction.

10. The apparatus of claim 6 wherein the spray wells are arranged as:
a first group which each incorporate a scarf comprising a ramped portion of the exterior surface which is oriented in an upstream direction, at an acute angle to the centerline axis; and
a second group which each incorporate a scarf comprising a ramped portion of the exterior surface which is oriented in a downstream direction, at an acute angle to the centerline axis, wherein the spray wells of the first group alternate with the spray wells of the second group around the periphery of the outer body.

11. A fuel nozzle apparatus, comprising:
a centrally-located pilot fuel injector;
a pilot fuel conduit coupled to the pilot fuel injector;
an annular main fuel injector surrounding the pilot fuel injector, comprising an enclosed interior volume in fluid communication with a plurality of main fuel ports configured to discharge fuel therefrom;
an annular outer body surrounding the main fuel injector, a venturi, and the pilot fuel injector the annular outer body having a generally cylindrical exterior surface, including an array of spray wells formed therein, each spray well being aligned with one of the main fuel ports, wherein some of the spray wells incorporate a scarf comprising a ramped portion of the exterior surface which is oriented at an acute angle to the centerline axis;
a main fuel conduit disposed upstream of the main fuel injector and configured to supply liquid fuel to the interior volume;
and a blocking device disposed within the main fuel conduit, the blocking device comprising an upstream end, a downstream end, and an axial length defined between the upstream end and the downstream end;
wherein the blocking device is spaced away from the main fuel injector by a portion of the main fuel conduit and comprises a fluid lock having a plurality of parallel capillary channels and wherein each capillary channel is configured such that a capillary meniscus will remain intact across each capillary channel during selected operating conditions; and
wherein a cross-sectional flow area of the main fuel conduit is greater than a cross-sectional flow area of each capillary channel.

12. The apparatus of claim 11 further comprising
a fuel system operable to supply a flow of liquid fuel;
a pilot valve which is coupled to the fuel system and to the pilot fuel conduit; and
a main valve which is coupled to the fuel system and to the main fuel conduit.

13. The apparatus of claim 12 wherein the spray wells are arranged as:
a first group which do not incorporate scarfs; and
a second group which each incorporate a scarf comprising a ramped portion of the exterior surface which is oriented at an acute angle to the centerline axis, wherein the spray wells of the second group alternate with the spray wells of the first group around the periphery of the outer body.

14. The apparatus of claim 13 wherein the spray wells of the second group are oriented at an acute angle to the centerline axis, in a downstream direction.

15. The apparatus of claim 12 wherein the spray wells are arranged as:
- a first group which each incorporate a scarf comprising a ramped portion of the exterior surface which is oriented in an upstream direction, at an acute angle to the centerline axis; and
- a second group which each incorporate a scarf comprising a ramped portion of the exterior surface which is oriented in a downstream direction, at an acute angle to the centerline axis, wherein the spray wells of the first group alternate with the spray wells of the second group around the periphery of the outer body.

16. The apparatus of claim 6 wherein at least one of the spray wells of the array of spray wells incorporates a scarf comprising a ramped portion of the exterior surface which is oriented at an acute angle to the centerline axis, the scarf interfacing with one of the plurality of fuel ports,
- wherein the scarf extends away from the associated fuel port of the plurality of fuel ports along a line and tapers in lateral width to a minimum width at a distal end.

17. The apparatus of claim 2 further comprising a main fuel valve, the main fuel valve in fluid communication with and upstream of the main fuel conduit,
- wherein a volume of fuel is contained in the main fuel conduit between the main fuel valve and the downstream end of the fluid lock.

18. The apparatus of claim 17 wherein each capillary channel of the plurality of parallel capillary channels has a diameter of 1.27 mm or less.

19. A fuel nozzle apparatus having a centerline axis, and comprising:
- a main fuel injector including an enclosed interior volume in fluid communication with a plurality of fuel ports configured to discharge fuel therefrom;
- a main fuel conduit disposed upstream of the main fuel injector and configured to supply liquid fuel to the interior volume of the main fuel injector;
- a main fuel valve, the main fuel valve in fluid communication with and upstream of the main fuel conduit;
- a pilot fuel injector including an enclosed interior volume in fluid communication with an exit structure configured to discharge fuel therefrom;
- a pilot fuel conduit disposed upstream of the pilot fuel injector and configured to supply liquid fuel to the interior volume of the pilot fuel injector;
- a pilot fuel valve, the pilot fuel valve in fluid communication with and upstream of the pilot fuel conduit;
- a fuel system, the fuel system upstream of and in fluid communication with both the main fuel valve and the pilot fuel valve;
- a fluid lock disposed within the main fuel conduit and spaced away from the main fuel injector by a portion of the main fuel conduit, the fluid lock comprising a plurality of parallel capillary channels, the fluid lock comprising an upstream end, a downstream end, and an axial length defined between the upstream end and the downstream end,
- wherein the plurality of parallel capillary channels extends along the axial length;
- wherein each capillary channel is configured such that a capillary meniscus will remain intact across each capillary channel during selected operating conditions; and
- wherein a cross-sectional flow area of the main fuel conduit is greater than a cross-sectional flow area of each capillary channel.

* * * * *